United States Patent [19]
Wythoff

[11] Patent Number: 5,275,444
[45] Date of Patent: Jan. 4, 1994

[54] SWIVEL HOSE COUPLING FOR PRESSURIZED FLUID, FUEL AND GAS SYSTEMS

[76] Inventor: Johan G. Wythoff, 542 S. Pacific St., #E-100, San Marcos, Calif. 92069-3561

[21] Appl. No.: 947,392

[22] Filed: Sep. 21, 1992

[51] Int. Cl.⁵ .................................. F16L 55/00
[52] U.S. Cl. ..................... 285/90; 285/92; 285/175; 285/185; 285/272
[58] Field of Search .............. 285/184, 271, 272, 273, 285/185, 191, 123, 90, 92, 175

[56] References Cited

U.S. PATENT DOCUMENTS

| | | | |
|---|---|---|---|
| 1,123,839 | 1/1915 | Bridges | 285/185 X |
| 1,301,453 | 4/1919 | Kendall | 285/185 |
| 1,605,507 | 11/1926 | Burke | 285/184 X |
| 4,437,690 | 3/1984 | Drath | 285/272 |
| 4,535,938 | 8/1985 | Lindabury | 285/185 X |
| 4,615,547 | 10/1986 | Sutcliffe et al. | 285/136 |
| 4,676,241 | 6/1987 | Webb et al. | 128/207.14 |
| 4,717,180 | 1/1988 | Roman | 285/185 X |
| 4,720,883 | 1/1988 | Sanchez | 285/185 X |
| 4,791,961 | 12/1988 | Nitzberg et al. | 137/614.04 |
| 4,934,742 | 6/1990 | Williamson | 285/212 |
| 5,044,674 | 9/1991 | Hendrickson | 285/168 |

Primary Examiner—Dave W. Arola
Attorney, Agent, or Firm—Brown, Martin, Haller & McClain

[57] ABSTRACT

A swivel coupling device is designed for coupling together the mating ends of two tubular fittings forming part of a pressurized fluid, fuel or gas connection system between a fluid, fuel or gas supply and an output device. The device has two relatively rotatable coupling parts with mating flat faces rotatably secured together in face-to-face engagement. Each of the flat faces has a recess with a circular outer periphery matching that of the recess in the other part, and each part has a passageway extending through it to the recess from a point on its outer surface remote from the flat face. Suitable connecting fittings are provided for connecting the passageway on each part to a respective tubular fitting so that the fittings can be swivelled, via dual axes, omnidirectionally, relative to one another while fluid, fuel or gas communication between the fittings is maintained through the passageways and recesses of the coupling.

9 Claims, 2 Drawing Sheets

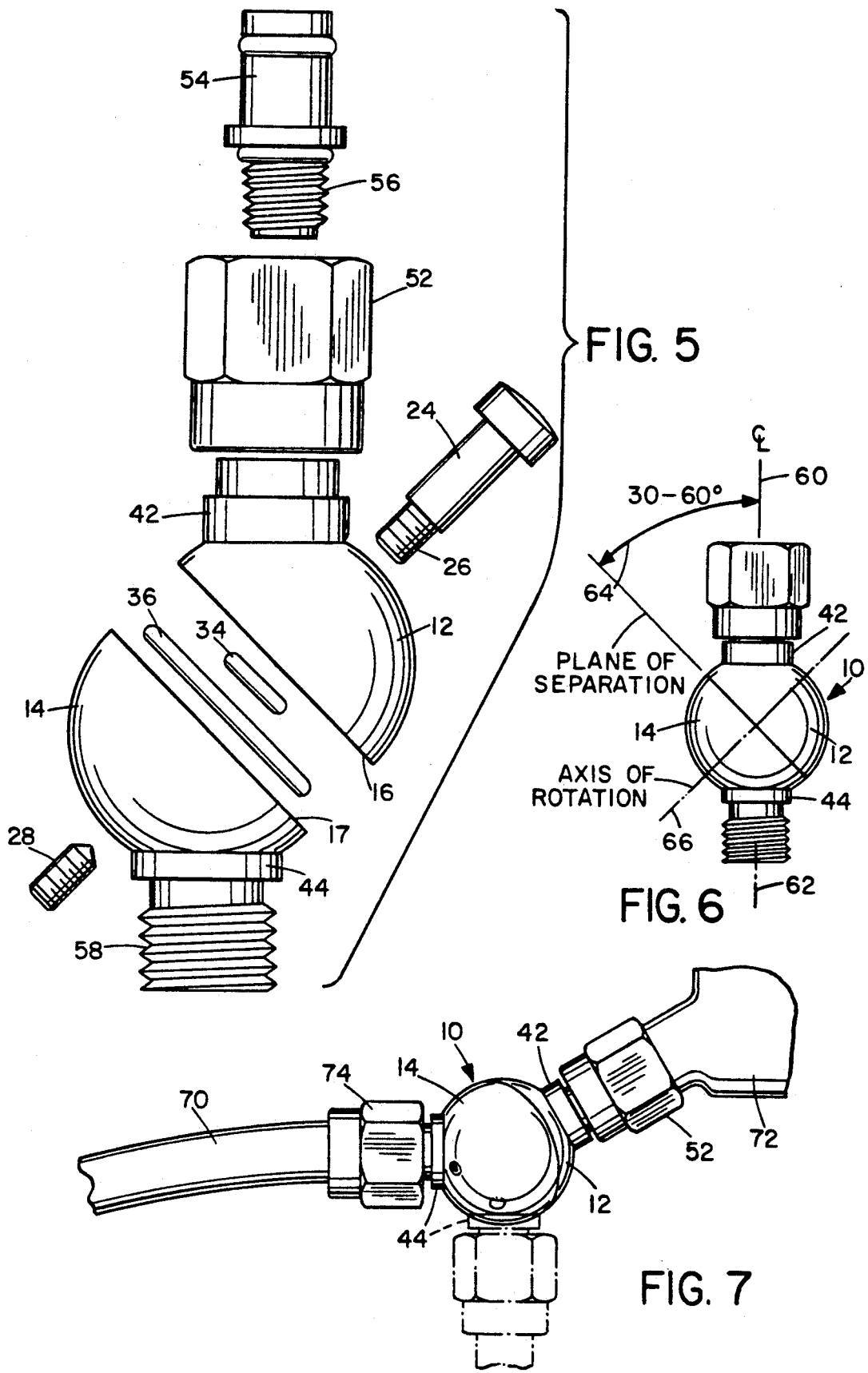

5,275,444

SWIVEL HOSE COUPLING FOR PRESSURIZED FLUID, FUEL AND GAS SYSTEMS

BACKGROUND OF THE INVENTION

The present invention relates generally to the connection between successive parts of a pressurized system, and is particularly concerned with a swivel coupling or joint for replacing a standard in-line fixed coupling between a hose and a supply of pressurized fluid, fuel or gas or between a hose and an output device, for example.

In fluid supply systems for supplying fluid, fuel or gas from a pressurized source to an output device for using the fluid, fuel or gas, a hose is generally coupled to the source at one end and to the output device at the other end. For example, in diving equipment, a hose connects the air tanks on a diver's back to a mouthpiece unit through which a diver breathes. In automobile engines, hoses connect a supply of braking fluid to the brake cylinders, and a fuel-line hose connects the gas tank to the engine. In garden sprinkler systems, hoses connect water supply taps to sprinkler nozzles. In all cases, rigid coupling devices such as interengaging threaded fittings are normally provided between the hose ends and supply or outlet device. This does not allow easy adjustment of the hose direction.

Some swivel connectors are known for use in fluid connecting systems, but these do not normally provide for omni-directional adjustment and are often relatively cumbersome.

SUMMARY OF THE INVENTION

It is an object of the present invention to provide a new and improved hose coupling device for coupling a hose to a fluid, fuel or gas source or output device.

According to the present invention, a hose coupling device is provided which comprises first and second relatively rotatable coupling members each having a flat coupling face, and a securing device for securing the members together with their flat faces in face-to-face engagement for relative rotation about a predetermined axis of rotation. Each coupling member has a recess with a circular periphery in its flat face which is centered on the axis of rotation and is dimensioned and positioned to coincide with the recess in the other coupling member when the members are placed in face-to-face engagement. Each coupling member has a passageway extending through the member to the recess, and a releasable connecting mechanism for releasably securing the passageway to a tubular fitting at the end of a hose, the outlet, or the inlet of a pressurized output device. At least one connecting mechanism has a central axis of connection which is offset at an angle to the axis of rotation of the device.

This device allows relative swivelling adjustment between two parts of a pressurized fluid system between which it is connected. For example, if the first coupling member is secured to a source of pressurized air, such as an air tank, and the second coupling member is secured to the end of a hose, the second coupling member and attached hose can be rotated about the axis of rotation, changing the angular orientation of the output hose relative to the gas tank input. Similarly, the first coupling member may be secured to an output device such as an air regulator mouthpiece for diving, while the second coupling member is secured to the output end of the hose, allowing the mouthpiece unit to be rotated easily via the swivel to the most comfortable and convenient position for the diver.

In a preferred embodiment of the invention, each recess comprises an annular groove centered on the axis of rotation, and each coupling member has a hollow neck projecting outwardly from its surface remote from the flat coupling face. The passageway extends through the neck to the recess on the flat face. The neck has suitable coupling means such as internal or external screw threads for connection to a conventional tubular fitting at the end of a hose or at the outlet of a fluid supply or the inlet of an output device. The two coupling members are preferably of hemispherical shape so that they form a generally spherical swivel joint when secured together in face-to-face engagement. Preferably, both inlet necks project radially from the hemispherical outer surfaces of the coupling members at angles offset from the axis of rotation of the joint or coupling.

This coupling allows angular adjustments in the relative orientations of different parts of a pressurized system to be made conveniently and easily. This avoids unnecessary stress on flexible hoses since they do not have to be bent or twisted to achieve any necessary angle change. The coupling can be used in any such system, i.e.: SCUBA, SCBA, and gases, fluid and fuel applications.

BRIEF DESCRIPTION OF THE DRAWINGS

The present invention will be better understood from the following detailed description of a preferred embodiment of the invention, taken in conjunction with the accompanying drawings, in which like reference numerals refer to like parts, and in which:

FIG. 5 is an exploded view of the components of the coupling;

FIG. 6 illustrates the swivelling geometry of the coupling; and

FIG. 7 is a side elevation view of a typical installation of the coupling, with the outlet in two different positions.

DESCRIPTION OF THE PREFERRED EMBODIMENT

Figure 1:
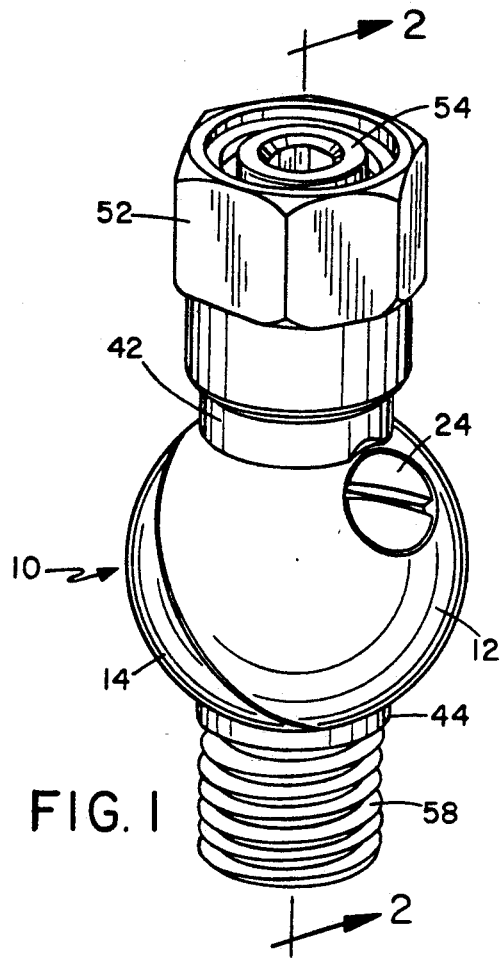
FIG. 1 is a perspective view of the coupling according to a preferred embodiment of the invention.

A swivel coupling 10 according to a preferred embodiment of the present invention for providing an adjustable joint between different parts of a pressurized fluid, fuel or gas connecting system is illustrated in the drawings. As best illustrated in FIGS. 1 and 2, the coupling device basically comprises two hemispherical coupling parts 12, 14 each having a flat coupling face 16, 17 and a releasable connecting device 18 for rotatably securing the parts 12 and 14 together with their flat faces in face-to-face engagement to form a generally spherical joint.

Each coupling part 12, 14 has a central through bore 20, 22, respectively. The connecting device comprises a headed pin 24 having a threaded end portion 26 for threaded engagement with an internally threaded portion of bore 22. Pin 24 extends through bore 20 with some free play to allow relative rotation between the pin and part 12 about the axis of the pin and bore, and is threadably secured to the other coupling part so that the two parts can be rotated relative to one another about their central axes. A lock set screw 28 extends into the opposite end of bore 22 to engage the end of pin 24, as illustrated in FIG. 2. If the pin 24 is screwed too tightly into bore 22, relative rotation between the parts will not be possible. The pin is screwed into bore 22 until the desired freedom of swivel is reached, and the lock set screw is then inserted to lock the pin against any further rotation in bore 22.

Figure 2:
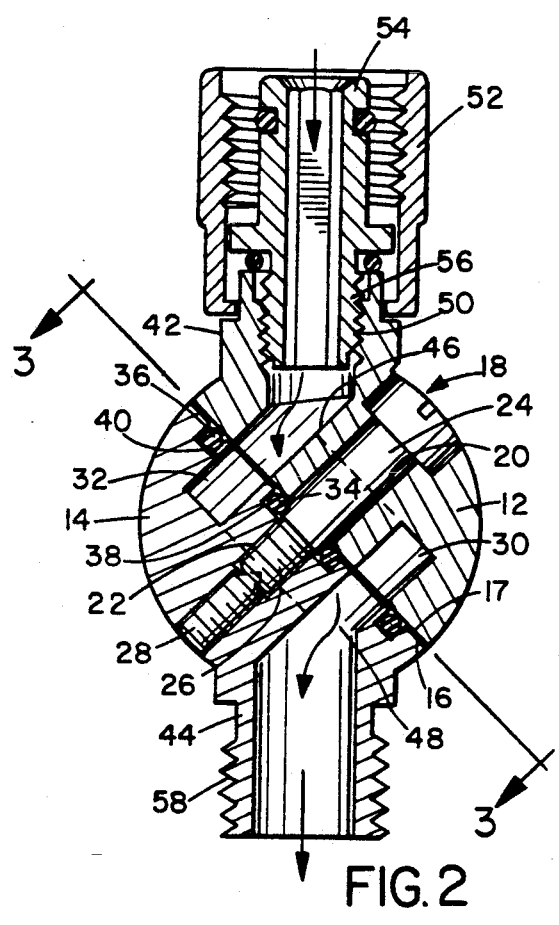
FIG. 2 is a sectional view taken on line 2—2 of FIG. 1.
Figure 3:
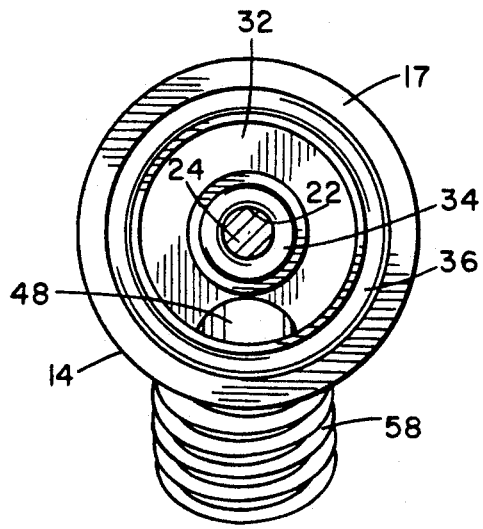
FIG. 3 is a sectional view taken on line 3—3 of FIG. 2.
Figure 4:
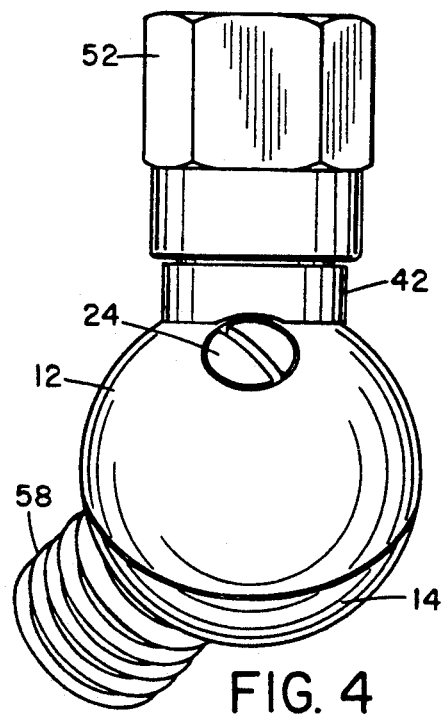
FIG. 4 is a side elevation view of the coupling in an offset position.

As best illustrated in FIGS. 2 and 3, each coupling part 12, 14 has an annular recess or chamber 30, 32 on its flat face 16, 17, respectively. Recesses 30 and 32 are each centered on the central axis. Additionally, the flat face 17 of part 14 has O-ring seals 34, 36 positioned in annular O-ring grooves 38, 40 on opposite sides of the annular recess 32, so that the mating recesses are sealed when the two parts are rotatably secured together as illustrated in FIG. 2. Each annular recess is of shape and dimensions matching those of the other annular recess, so that when the parts are secured together in face-to-face engagement as illustrated in FIG. 2, the two recesses coincide. Although the recesses are of annular shape in the illustrated embodiment, other shapes of recess may be used as long as they have a matching, circular outer periphery.

Each coupling part 12, 14 has an outwardly projecting, hollow neck 42, 44 on its hemispherical surface defining an inlet or outlet connected through internal passageways 46, 48 to the recess 30, 32 on the flat surface of the respective part. Each projecting neck has a suitable connecting or fastener mechanism for releasably securing the neck to a tubular fitting of a passageway system. Any suitable fastener mechanism or fitting may be formed at the ends of the projecting necks 42, 44. In the illustrated embodiment, neck 42 has internal screw threads 50 and a fastener nut 52 is rotatably secured to neck 42 via internal nipple or pivot stem 54 which has a threaded end 56 for threaded engagement with the internal threads in neck 42. Nut 52 can then be secured to a male tubular fitting, and the coupling can be rotated about the axis of nut 52 by virtue of the rotatable coupling between nut 52 and neck 42. Neck 44 has external threads 58 suitably dimensioned for threaded engagement with a corresponding female coupling nut or fitting.

As best illustrated in FIG. 6, each neck 42, 44 has a central axis 60, 62 which defines the axis of connection of the respective coupling part to a tubular fitting. Preferably, at least one of the necks defines a connection axis which is offset at an angle 64 to the first axis of rotation 66 of the coupling. In the illustrated embodiment, both necks are offset at a similar angle to the axis of rotation, and this angle is preferably in the range of 30° to 60° to provide the optimum relative swivelling motion between the parts. The entire coupling can also be rotated about a second axis of rotation, axis 60 of neck 42, to provide omni-directional angular adjustment between necks 42 and 44.

FIG. 7 illustrates an example of the installation of the swivel coupling between a hose 70 and an output device 72 such as a regulator mouthpiece for diving equipment. However, it will be understood that the coupling device can also be installed to provide adjustability at other points in a diver's air supply system, or in any type of pressurized fluid, fuel or gas delivery system. In the illustrated embodiment, a female threaded nut or fitting 74 at the end of hose 70 would normally be engaged over an externally threaded fitting (not visible in the drawings) at the inlet to mouthpiece unit 72. This provides a rigid connection and allows no angular adjustment. In order to provide adjustability in positioning the mouthpiece unit, the parts are separated and the coupling is secured between them to provide a swivel joint, as illustrated in FIG. 7.

The internally threaded nut or fitting 74 on the hose 70 is secured to the externally threaded neck of part 14, which in this case acts as the inlet of the coupling, while the nut fitting 52 secured on the neck of part 12 is secured to the externally threaded inlet to device 72, so that part 12 acts as the outlet. At this point the hose 70 can be swivelled through a 360° arc by rotating coupling part 14 about the axis of rotation 66. Additionally, in any one angular position of hose 70 relative to neck 42, the entire coupling can be swivelled about axis 60, rotating neck 62 about axis 60. FIG. 7 illustrates two different possible positions of hose 70, although it will be understood that omni-directional adjustment providing a large number of different relative positions is possible with this arrangement by virtue of the dual axes of rotation. The inlet and outlet remain in communication via the central annular recesses in the two parts whatever the relative angular orientation of the inlet and outlet necks, since the annular recesses will be in communication with one another at all times regardless of the relative rotation between the parts. The connecting pin 24 can be adjusted so that the parts are sealed together sufficiently to prevent leakage from the joint while still permitting relative rotation between the parts.

The coupling device may be made in any desired dimensions depending on the requirements of the system with which it is to be used. It may be used as a joint in any liquid, fuel or gas delivery systems, in any application where a fluid supply must be connected to a remote output device via a hose. Any type or size of connecting fittings may be provided on the input and output necks of the two parts of the coupling, dependent on the application. The device may be made from any suitable material, according to the pressure requirements. In one example used for diving equipment as explained above, the swivel coupling was made of brass.

Although a preferred embodiment of the invention has been described above by way of example only, it will be understood by those skilled in the field that modifications may be made to the disclosed embodiment without departing from the scope of the invention, which is defined by the appended claims.

I claim:

1. A swivel coupling device for a pressurized communication system, comprising:
   first and second coupling parts, each coupling part having a flat planar coupling face with each entire coupling face lying within the boundaries of the plane defining said flat planar face;
   securing means for securing the parts together with their flat faces in face-to-face engagement for relative rotation about a central axis of rotation;
   each of the flat coupling faces having an annular recess of dimensions matching those of the annular recess in the other part with a circular outer and inner periphery matching those of the other coupling face so that the two recesses are coincident when the members are rotatably secured together;

spaced inner and outer seal means mounted between said flat faces on opposite sides of said annual recesses and spaced entirely away from said recesses for rotatable sealing engagement between the opposing flat faces of said parts;

one of the parts having a hollow inlet neck projecting from the outer surface of the part remote from the flat coupling face, and an internal passageway connecting the inlet neck to the recess in the flat face, and the other part having a hollow outlet neck projecting from its outer surface remote from the flat coupling face, and an internal passageway connecting the outlet neck to the recess in the flat face of the part;

at least one of the necks having a central axis extending at a predetermined angle to said axis of rotation;

each of each necks having connecting means for releasably securing said neck to a tubular fitting forming part of a connection system;

one of said connecting means comprising means for rotatably connecting said one neck to a tubular fitting for rotation of said coupling parts together about a second axis of rotation.

2. The device as claimed in claim 1, wherein both of said necks have a central axis extending at a predetermined angle to said axis of rotation.

3. The device as claimed in claim 2, wherein said angle is in the range from 30° to 60°.

4. The device as claimed in claim 1, wherein each of said parts is of hemispherical shape and said central axis of rotation coincides with the central axes of said hemispherical parts.

5. The device as claimed in claim 1, wherein each of said parts has a central through bore, and said securing means comprises a pin member having a head at one end and a stem extending through the bore in one of said parts with some free play to allow relative rotation between the pin and said one part, the stem being secured in the bore in the other part at its opposite end to rotatably secure the parts together.

6. The device as claimed in claim 5, including a lock set screw extending into the opposite end of the bore in said other part for locking engagement with the end of said stem.

7. The device as claimed in claim 1, wherein said one connecting means comprises a hollow stem member secured to said one neck and a nut member rotatably secured to said hollow stem member, said nut member having screw threads for securing the nut member to a tubular fitting.

8. A swivel coupling device for providing a swivel joint between two tubular fixtures forming part of a fluid, fuel or gas connection system, the device comprising:

first and second relatively rotatable coupling members, each member having a flat, planar coupling face with each entire coupling face lying within the boundaries of the plane defining said flat planar face;

securing means for rotatably securing the coupling members together with their coupling faces in face-to-face engagement for relative rotation about a central axis of rotation;

each of said coupling faces having an annular recess with a circular outer periphery and a circular inner periphery centered on said central axis, each recess being shaped and dimensioned to match the recess in the opposing coupling face so that the recesses are coincident when the members are secured together;

one of said members having an inlet passageway projecting inwardly from its outer surface at a position spaced from said flat face and connected through the member to the recess in said flat face, and the other member having an outlet passageway projecting inwardly from its outer surface at a position spaced from the flat face of said member and connected through the member to the recess in said flat face;

each member having releasable connecting means for releasably connecting the respective inlet and outlet passageways to a pair of tubular fixtures to allow relative swivelling movements between the fixtures;

at least one of said connecting means comprising means for connection to a tubular fixture at a predetermined angle to said axis of rotation; and spaced inner and outer seal means mounted between said flat faces for rotatable sealing engagement between the opposing flat faces of said parts, said inner seal means being spaced entirely inwardly from the inner periphery of said annular recesses and said outer deal means being spaced entirely outwardly from the outer periphery of said annular recesses.

9. The device as claimed in claim 8, wherein one of said flat faces has a pair of spaced annular grooves on opposite sides of said annular recess for receiving said inner and outer seal means, each said seal means comprising an O-ring seal.

* * * * *

UNITED STATES PATENT AND TRADEMARK OFFICE
CERTIFICATE OF CORRECTION

PATENT NO. : 5,275,444
DATED : JANUARY 4, 1994
INVENTOR(S) : JOHAN G. WYTHOFF

It is certified that error appears in the above-indentified patent and that said Letters Patent is hereby corrected as shown below:

- COLUMN 6, line 45, delete "deal" and insert --seal--.

Signed and Sealed this

Fourteenth Day of June, 1994

Attest:

BRUCE LEHMAN

*Attesting Officer*   Commissioner of Patents and Trademarks